United States Patent [19]

Severson

[11] 4,160,537

[45] Jul. 10, 1979

[54] TIRE SPREADING AND INSPECTING MACHINE

[75] Inventor: Larry A. Severson, West Fargo, N. Dak.

[73] Assignee: Applied Power, Inc., Milwaukee, Wis.

[21] Appl. No.: 871,529

[22] Filed: Jan. 23, 1978

[51] Int. Cl.$^2$ .............................................. B60C 25/14
[52] U.S. Cl. ................................................ 254/50.3
[58] Field of Search .............................. 254/50.1–50.4

[56] References Cited

U.S. PATENT DOCUMENTS

| | | | |
|---|---|---|---|
| 2,895,711 | 7/1959 | Branick | 254/50.3 |
| 3,130,957 | 4/1964 | Branick | 254/50.3 |
| 3,830,469 | 8/1974 | Oaks | 254/50.3 |

*Primary Examiner*—Robert C. Watson

[57] ABSTRACT

The tire spreading and inspecting machine of the present invention includes a frame for supporting a tire in an inspection position. Drive rollers are provided on the frame for rotating the tire about its axis and specially designed spread arms are arranged for engaging the beads of the tire and spreading them apart to permit inspection of the tire carcass. An offset in the spreading arms prevents the rollers from jumping out of the tire as the tire is rotated. Sidewall support rollers are also provided on the frame for contacting the sidewalls of the rotating tire to prevent the tire from collapsing before sufficient spread is achieved. This feature is particularly important when the machine is used for inspecting radial tires whose characteristics make inspection on conventional equipment impractical. Finally, a tire lift attached to the frame includes a lock and roller for applying pressure to the tire to prevent it from coming off the rollers during rotation.

30 Claims, 3 Drawing Figures

TIRE SPREADING AND INSPECTING MACHINE

FIELD OF THE INVENTION

The present invention relates generally to the art of tire spreading and inspecting devices and more particularly to such devices which are especially suitable for inspecting radial, as well as biased ply, tires.

BACKGROUND OF THE INVENTION

Several types of machines are known to the art for permitting the inspection of tire carcasses. For example, in Stoehr's U.S. Pat. No. 2,375,595, issued May 8, 1975, for "Tire-Casing Spreading And Inspecting Machine" the device includes a frame with a pair of spaced apart parallel rollers and a lifting mechanism for elevating the tire to its inspection position resting on the rollers. A pair of spreading hooks are located on either side of the tire and are adapted for engaging the tire beads to spread them apart. Fluid power means are provided for the lift system and for spreading the tire hooks.

The type of machine disclosed in Stoehr's Patent has several disadvantages. First, the lift system must be carefully controlled by the machine operator to properly place the tire on the machine. Second, the machine is not adapted for automatic inspection of the entire carcass because the hooks do not permit the tire to be rotated while the beads are spread. If inspection of more than one location is required, the hooks are disengaged from the beads, the tire is manually rotated on the support rollers and the hooks are re-engaged and activated to spread the beads at the new location. Thus, the inspection of the entire inside surface of the tire is a time-consuming process. Finally, the Stoehr device is unsatisfactory for use with radial tires because the spreading hooks tend to collapse the sidewalls of radial tires.

Another type of prior art tire inspecting machine is disclosed in Branick's U.S. Pat. No. 3,130,957, issued Apr. 28, 1964 for "Truck Tire Spreading and Inverting Device." The Branick machine also includes a frame and a lifting system for raising a tire to an inspection position. This device, however, differs substantially from the Stoehr machine in providing spreading hooks on each side of the tire which permits the tire to be rotated while the beads are spread. Rotation of the tire is made possible by an inverting head which is adapted to engage the tire tread between the spread rollers and push the tread toward the tire axis.

While the Branick system represents a significant improvement over the Stoehr device, it still does not overcome the problems inherent in the inspection of radial tires. The spreading hooks of Branick also tend to collapse the sidewalls of radial tires, and the alignment system of Branick's device still requires the exercise of caution by the machine operator to avoid dislodging the tire during elevation and inspection.

A tire spreading and inspecting device which overcomes the above-noted disadvantages of the prior art would be a significant advance in this technology.

OBJECTS OF THE INVENTION

A principal object of the present invention is to provide an improved tire spreading and inspecting machine which overcomes the above-noted disadvantages of the prior art.

An object of the present invention is also to provide a tire spreading and inspection device which permits a tire to be rotated while the tire beads are spread apart and pulled downwardly.

Another object of the present invention is to provide a tire spreading and inspecting machine which permits continual rotation, spreading and inspection of radial tires.

Yet another object of the present invention is to provide a tire spreading and inspecting machine which supports the tire sidewalls during bead separation and rotation to prevent collapse thereof.

A still further object of the present invention is to provide a tire spreading and inspection machine which includes an improved tire lifting and alignment system for properly locating the tire on the machine and for preventing dislodging of the tire from the machine during the process of tire inspection.

How these and other objects of the invention are accomplished will be described in the following specification taken in conjunction with the FIGURES. Generally, however, the objects are accomplished by providing a tire spreading and inspection frame including a pair of parallel, spaced apart drive drums. Means are provided for rotating the drums. At one end of the machine, a lift system is provided for raising the tire onto the drums. The lift system includes a locking device so that the lift frame can be used to apply pressure to the tire when it is been rotated on the drums to prevent the tire from coming off the drums during inspection. At the opposite end of the frame a guide/stop is provided which prevents the lift from pushing the tire off that end of the machine and also prevents the tire from tipping off the side of the machine during use. A bead spreading system is also mounted to the frame and includes two pairs of engagement rollers located intermediate the tire-drive drums on either side of the tire. The engagement rollers are supported on arm members and are adapted for being placed on the inside of the tire beads and are coupled to means for spreading the rollers to spread the beads apart and pull them downwardly to open the tire carcass for inspection. The arms are designed with an offset which keeps the rollers in the tire during tire operation. Finally, a pair of sidewall support rollers are mounted on the frame to prevent the tire sidewalls from collapsing before sufficient spread is achieved. This latter feature is especially important if the machine is to be used to inspect radial tires, as the sidewalls of such tires are more likely to collapse than the sidewalls of biased-ply tires. Numerous other details of the invention and variations thereof which are intended to fall within its scope will also be described in the following specification.

DESCRIPTION OF THE PREFERRED EMBODIMENT

Figure 1:
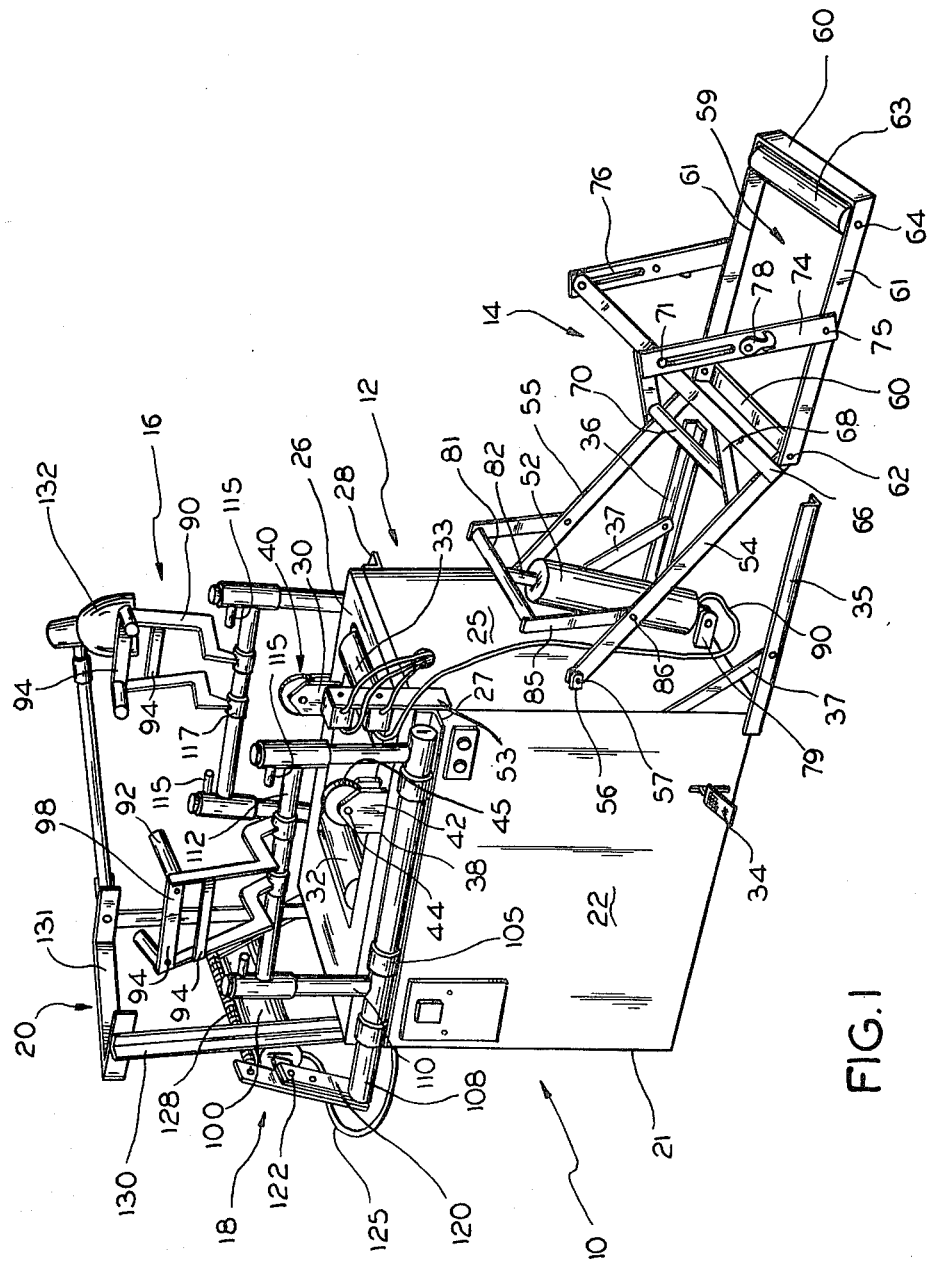
FIG. 1 is a perspective view of the tire spreading and inspecting machine according to the preferred embodiment of the present invention.

Referring generally to FIG. 1, a tire spreading and inspecting machine 10 according to the preferred form of the invention is shown to include a tire support and rotation assembly 12, a tire lift assembly 14, spreader arms 16, hydraulic spreader arm activator system 18 and a guide/stop assembly 20. Each of these components will be described in detail with reference to FIGS. 1-3.

Figure 3:
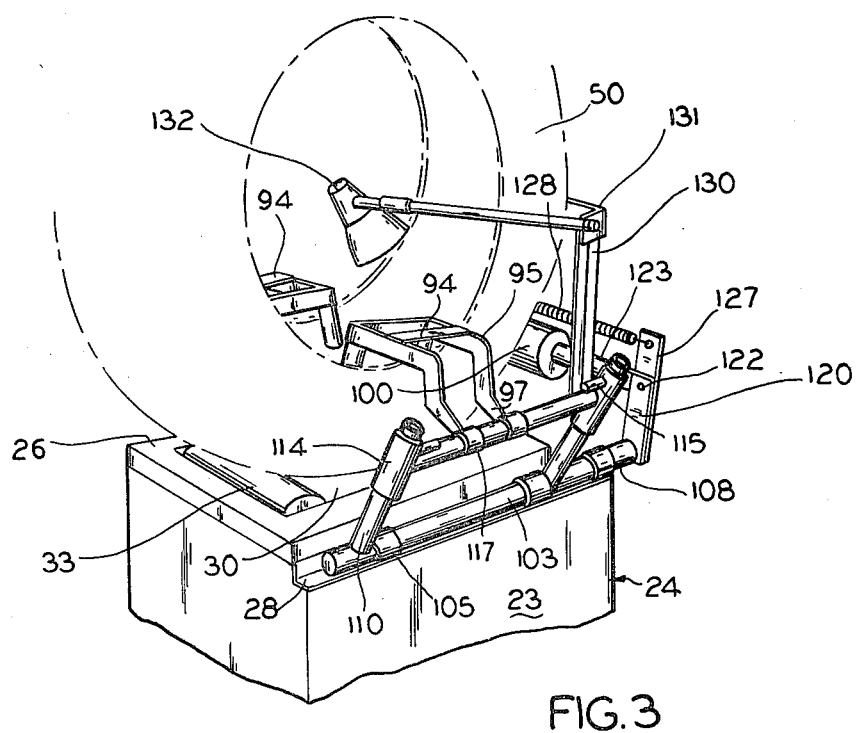
FIG. 3 is a rear perspective view of the tire spreader and inspection machine of FIG. 1 and showing a tire with its beads spread for inspection.

As shown in FIGS. 1 and 3, the tire support and rotation assembly comprises a box-like frame 21, having rectangular front and back panels 22 and 23 respectively, generally rectangular left and right end panels 24 and 25 and a top 26. As can best be seen by reference to FIG. 3, the top surface 26 is narrower than end panels 24 and 25 so that a pair of right angle channels 27 and 28 are formed across the top of the front and rear of frame 21.

Top surface 26 also includes a rectangular cutout 30 and disposed within frame 21 and presented at the opening created by cutout 30 are a pair of tire-drive rollers 32 and 33. The rollers 32 and 33 are oriented perpendicularly to the front and back panels and are parallel to one another and spaced apart from one another by about a foot or more. While not shown in the drawings, it should be apparent that a motor drive system (for example, a motor, chain and sprockets) is provided within frame 21 for driving rollers 32 and 33 in the same direction, and as will be more fully understood hereafter for rotating a tire during tire inspection. At the bottom of frame 21 a foot pedal 34 is provided for allowing the machine operator to stop the tire rotation at any point to more closely inspect the section of the tire. Actually, more foot pedals 34 can be provided so that rotation can be stopped by the operator whether he is standing in front of, behind or at the end of machine 10. While the details of this portion of the construction are not shown, the construction will be within the skill of one familiar with motor systems and, in and of itself, the drive systems for rollers 32 and 33 forms no part of the present invention.

Other components of the tire support and rotation assembly 12 which are shown in FIG. 1 include a pair of elongate brace bars 35 and 36 rigidly secured to the bottom corners of end panel 25. Bars 35 and 36 may be angle iron and extend outwardly from end panel 25 along the floor. Bracing struts 37 are also provided between panel 25 and bars 35 and 36. The purpose of bars 35 and 36 is to brace frame 21 when a tire 50 is being lifted by lift assembly 14. The final components of the tire support and rotation assembly 12 are a pair of sidewall support rollers 38 and 40. The rollers are located at the sides of opening 30 and generally midway between the drive rollers 32 and 33. The rollers 38 and 40 each include a pair of generally pentagonal plates 42 with one of their sides attached to the top surface 26 adjacent cutout 30 so that the plates extend upwardly and inwardly toward and above the center of frame 21. The plates 42 are spaced apart from one another and a pin 44 passes between the two plates just below the uppermost points thereof. Bolts 44 support a rubber-edged wheel 45 between the plates 42, the wheel having an axis of rotation in the normal position of about 45° with respect to the top 26 of frame 21. The function and mode of operation of sidewall-support rollers 38 and 40 will be more fully understood when the method of operation of machine 10 is explained in a later section of this specification. It should also be understood that the overall height of frame 21 is selected so that a tire 50 (see FIGS. 2 and 3) supported upon frame 21 will be at a convenient height. A height of about 28" is preferred for frame 21, but this height is mentioned for purposes of illustration and should not in any way be taken as limiting the scope of the present invention. Not shown in the FIGURES is the power supply line for the drive motor. In the preferred embodiment the motor is an electric motor.

Figure 2:
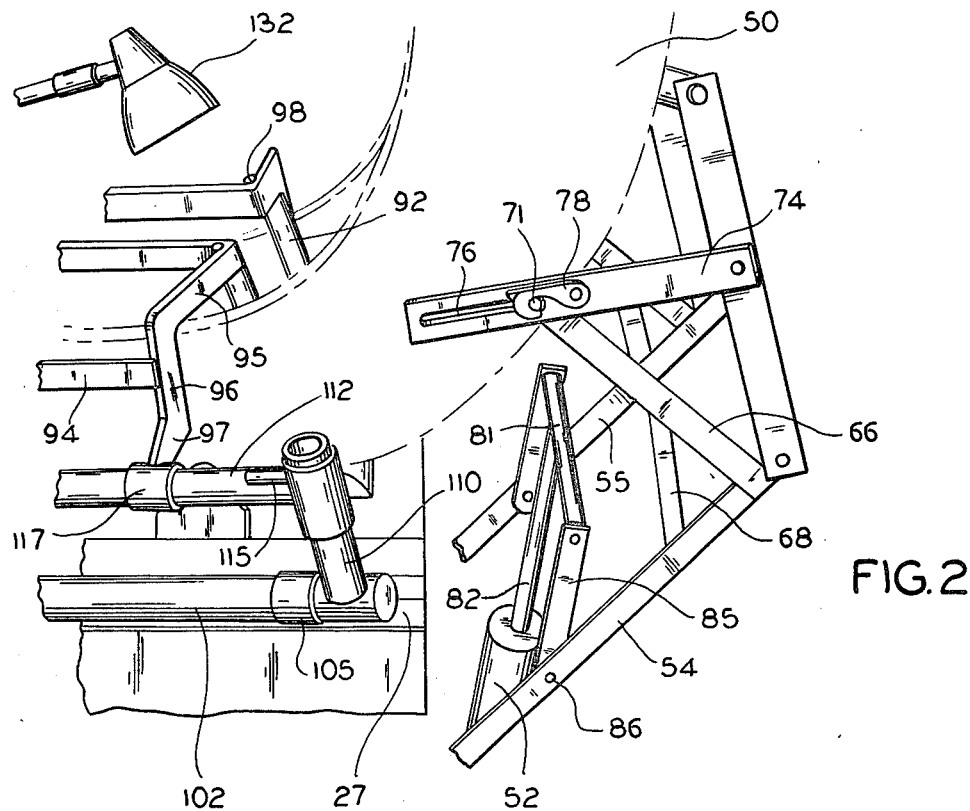
FIG. 2 is an enlarged perspective view of a portion of the tire spreading and inspecting machine of FIG. 1 illustrating in greater detail the tire lift and spreader arm portions thereof and showing a tire mounted on the machine.

The lift assembly 14 of machine 10 is shown in FIGS. 1 and 2. It includes a pneumatic cylinder 52 and a framework for lifting a tire 50 from the floor to the inspection position with the tire tread resting on drive rollers 32 and 33. Assembly 14 also includes a lock mechanism (soon to be described) for applying pressure to the tire 50 to prevent the tire from moving off the drive rollers 32 and 33 during inspection and operation of machine 10. The framework of assembly 14 includes a pair of parallel elongate metal bars 54 and 55 the first ends of which are pivotally mounted to brackets 56 on end panel 25 by coupling pins 57. Brackets 56 are located adjacent the front and back of panel 25 and about halfway between the floor and top 26. Moreover, the bars 54 and 55 are arranged so they can rotate in a plane which is perpendicular to panel 25. Bars 54 and 55 are long enough so that the free ends thereof rest on the floor about two feet or more to the right of frame 21.

Pivotally mounted between the free ends of bars 54 and 55 is a rectangular metal tire-lift frame 59 including parallel end members 60 and parallel side members 61. Frame 59 has a length sufficient to allow tire 50 to rest between its ends but the length of side members 61 are less than the diameter of tire 50. Bars 54 and 55 are coupled to adjacent end corners of frame 59 by pins 62.

A metal roller 63 is rotatably mounted between the side members 61 of frame 59 adjacent its outer end. A rod 64 passes through roller 63 and is secured to the side members 61. Roller 63 is oriented with its axis parallel to the floor and to end panel 25. The function of roller 63 will be more fully described hereafter.

Lift assembly 14 also includes a generally triangular coupling arrangement between each of bars 54 and 55 and the frame 59. The coupling arrangement includes a rigid elongate plate 66 welded perpendicularly and upwardly at the end of bars 54 and 55 and a bracing strut 68 between each of bars 54 and 55 and its respective plate 66. A cross brace bar 70 is provided between the struts 68 to provide additional structural rigidity. A pin 71 is included which extends outwardly from the free end of each of plates 66 so that one pin extends toward the front of machine 10 and the other pin extends toward the rear of machine 10. Two further elongate plate members 74 are provided. Plates 74 are pivotally mounted to side members 61 of frame 59 by pins 75 at approximately the midpoint of the side members 61. Plates 74 each include an elongate slot 76 which extends from about the midpoint of plate 74 to a location just inwardly of the free end thereof. The slots 76 mate with pins 71 as is shown in FIGS. 1 and 2. The final components of the triangular coupling arrangement are a pair of latches 78, one on each of plates 74. Latches 78 are movable from a first position shown in FIG. 1 to a second position shown in FIG. 2 for locking plates 66 and 74 in the position shown in FIG. 2. When in this position the pins 71 are located at the lower ends of slots 76. Any suitable locking mechanism may be employed and the invention should not be limited by the particular type of latch 78 illustrated in the drawings.

To complete the description of the lift assembly system 14, the connection between the lifting frame and cylinder 52 will now be described. The cylinder 52 is mounted to end panel 25 by bracket 79 adjacent the bottom of panel 25 midway between bars 54 and 55. A hose 80 is coupled to cylinder 52 and to a supply of air (not shown) and a control 53 for the cylinder is provided at the front of machine 10 for extending the piston of cylinder 52. Likewise, the control can cause removal of the air from cylinder 52. The piston 82 of cylinder 52 is coupled to a cross-bar 81 which is just slightly narrower than the distance between bars 54 and 55 and two plates 85 pivotally connect the bars 54 and 55 and the cross-bar 81. The plates 85 are coupled to bars 54 and 55 by pins 86 about ⅓ of the way between end plate 25 and frame 59. It will be evident from the foregoing description that extension of piston 82 will raise bars 54 and 55 and the lift frame 59 toward the tire support and rotation assembly 12.

The spreader arms 16 can best be described by reference to FIGS. 1 and 3. The arms 16 are designed not only to pull apart the beads of tire 50 but to pull down on them, a feature which is especially important when machine 10 is to be used with radial tires.

Spreader arms 16 each include a pair of arm elements 90, a pair of rollers 92 and struts 94 coupled between members 90. The arm elements 90 each include three portions, the first and second portions 95 and 97 respectively being joined perpendicular to one another with third portion 97 being coupled to the opposite end of portion 96 and extending away from portion 95. All three portions lie in a common plane and an obtuse angle is formed between portions 96 and 97 so that an offset is created in arms 16. Rollers 92 are secured perpendicularly to the free end of portions 95 by bolts 98 whereby rollers 92 and the first and second portions of arm elements 90 form a generally C-shaped assembly. Struts 94 are welded between the arm elements 90.

The particular shape of the spreader arms 16 is an important feature of the present invention, but it should be realized that the size of arms 16 and the distance between roller 92 may be variously modified for different types and sizes of tires to be inspected on machine 10. However, the distance between the rollers 92 and the second portion 96 of the arm elements 90 should be sufficient to allow the rollers 92 to be placed inside the tire carcass when the second portion 96 is outside of the tire 50 and adjacent its sidewalls.

The activator system 18 for moving the spreader arms 16 will now be described. It includes a pneumatic cylinder 100 together with suitable means for coupling the cylinder 100 to spreader arms 16. The coupling system 18, in turn, includes a pair of elongate pipe members 102 and 103 which are mounted in channels 27 and 28, such as by brackets 105, so that they may be mounted about their axis. Pipes 102 and 103 are longer than frame 21 and are mounted so that a portion 108 of each pipe extends outwardly from the left end panel 24 of frame 21.

A pair of shorter pipes 110 are welded, or otherwise suitably attached, to each of pipes 102 and 103 such that the short pipes are perpendicular to the longer pipes 102 and 103. The shorter pipes 110 are spaced apart from one another on pipes 102 and 103 and are generally adjacent the outside of the drive rollers 32 and 33. Each of the pipes 110 includes a pair of opposed and aligned holes (not shown) near its top for a purpose which will soon become apparent.

A spreader arm support pipe 112 is mounted to each of the pairs of pipes 110. The mounting is accomplished by welding sleeve members 114 to each end of pipe 112, the sleeve members 114 being sized and spaced apart by a distance which permits them to be slideably disposed over the tops of pipes 110. The sleeves also include a pair of opposed and aligned holes (not shown) which are adapted to overlap the holes in pipes 110 so that the pipe 112 can be locked to pipes 110 such as by spring loaded pins 115 best shown in FIG. 2.

The spreader arms 16 are mounted to the respective support pipes 112 by annular collars 117 which are in turn welded to the free ends of portions 97 of arm elements 90. The collars are sized so that a snug fit is created, but it will be evident that the spreader arms 16 are free to rotate about the axis of pipe 112.

The rotation capability is illustrated by reference to FIGS. 1 and 2. In FIG. 1, the spreader arms 16 are shown in a raised position whereby the arm elements 90 and rollers 92 are out of the plane of movement of tire and do not interfere with the raising of the tire 50 to its inspection position. On the other hand, FIG. 2 shows the spreader arms in an operating position in which the rollers 92 of each spreader are within the tire carcass and adjacent the inside of the beads of the tire 50. From the foregoing description it will also be appreciated that different spreader arms can be employed on machine 10 simply by removing pins 115, lifting off the spreader arm support pipes 112 and by replacing them with another set of proper sized spreader arms as desired.

The next feature of the present invention to be described is the method of coupling cylinder 100 to the pipes 102 and 103. This is accomplished by providing a pair of lever plates 120 on extension 108 or pipes 102 and 103 just inwardly of the free ends thereof. Plates 120 may be generally parallel to pipes 110 but as shown in the FIGURES, the preferred configuration is for the plates 120 to be directed inwardly slightly toward one another. A hole is provided near the top of each bracket 120 which serves as the connecting means for cylinder 100, such as by bolts 122. In the illustrated embodiment, cylinder 100 is coupled to the plate 120 at the front of machine 10 while the piston 123 of cylinder 100 is coupled to the opposite bracket 120 as is shown in FIG. 3. A hose 125 is coupled to a source of pressurized air and the cylinder 100 for extending piston 123 and it will be appreciated that such extension causes the upper portion of plates 120 to be spread apart with the resultant rotation of pipes 102 and 103 and spreading of arms 16. The control for activating cylinder 100 is not shown, but such control at the discretion of the machine operator would be a matter within the ordinary skill of one familiar with pneumatic cylinders.

Also coupled to the free ends of pipes 102 and 103 are another pair of elongate plates 127. The latter plates are generally parallel to plates 120 but are longer than plates 120 so that they extend to a point above the top surface of cylinder 100. A tension spring 128 is coupled between the tops of plates 127, the spring 128 being in its relaxed position when the piston 123 of cylinder 100 is retracted. Extension of piston 123 causes spring 128 to stretch as is shown in FIG. 3 and when the piston is retracted once again, the spring aids in returning plates 120 to their initial position shown in FIG. 1.

The final component of the tire inspecting machine 10 is a guide/stop frame 20 which is mounted to the top left corners of frame 21. Frame 20 includes a pair of angle iron vertical supports 130 welded to frame 21 at such corners, the height being approximately equal to the average radius of the tires to be inspected on machine 10. Attached between the tops of supports 130 is a generally U-shaped guide frame 131 which includes ends extending generally toward the right side of machine 10 and along the plane of front and back panels 22 and 23 respectively. The guide frame 131 is provided for surrounding the tire 50 when it is in its inspection position and to prevent the tire from falling off machine 10 during rotation. The guide frame 131 also serves another function, i.e. to protection of the tire from being pushed off the left end of machine 10 when it is being raised from the floor to its inspection position. Thus, if lift system 14 rolls tire 50 onto the drive rollers 32 and 33 with sufficient force to cause the tire to roll off the left side of machine 10, the guide/stop frame 20 will stop such movement and align the tire in its proper operating position.

Supported on frame 131 is a light 132 for illuminating the area of tire 50 to be inspected. The light 132 may be of the goose neck or other adjustable variety so that the light beam can be properly focused on the tire 50. Of course, any number of such types of lights can be employed, but the light system will not be described in detail, as such light in and of itself forms no part of the present invention.

The operation of machine 10 will now be described. A tire 50 to be inspected is rolled onto the frame 59 of lift system 14 so that the tire is positioned with its axis parallel to the floor and to end panel 25 at the right end of machine 10. The machine operator then activates the control for cylinder 52 which causes frame 59 to be elevated about a circular arc having brackets 56 at its center. The tire 50 in turn is elevated so that it can be rolled onto the drive rollers 32 and 33. The latch 78 of lift system 14 is closed while the piston of cylinder 52 is extended, whereby the roller 63 of frame 59 is located adjacent tire 50. This feature of the invention is only required when radial tires are being inspected on machine 10. The guide/stop frame 20 on the other side of the tire simultaneously insures alignment and provides a barrier to tire movement except about its axis.

The next step is the activation of the spreader arms 16 which are first placed inside the tire beads by rotating arms 16 about pipes 112. The operator then supplies fluid to cylinder 100 so that the spreader arms are displaced from one another to spread the tire beads. It is important to note that the construction of the tire spreading mechanism, especially the offset of arm element 90 causes not only a spreading of the beads but a simultaneous downward pull by rollers 92. This novel construction also insures that the rollers 92 will remain in the tire as it is being rotated.

Rotation itself is accomplished by the foot control pedel 34 and drive rollers 32 and 33. Inspection can be carried out while the tire is being slowly rotated or the drive rollers can be operated intermittently to permit the operator to inspect segmental portions of the carcass. Of course, the spreader arms 16 can be extended or closed at the discretion of the operator during tire rotation as may be required. During the entire process of rotation and inspection the sidewalls of the tire will be supported by wheels 45. Absent such support, the sidewall could easily collapse under the spreading and downward pulling forces required to open the tire beads for inspection. Following inspection, the tire is lowered to the floor using lift assembly 14. It is necessary to urge the tire 50 against the frame 59 as it starts its downward journey and this can be done by hand or by clamp or strap means not shown.

So while invention has been described in connection with a particular preferred embodiment, the invention is not to be limited thereby but is to be limited solely by the claims which follow.

I claim:

1. A machine for rotating and inspecting a tire comprising:
   a support assembly for supporting a tire in a vertical position, said support assembly including drive means for rotating a tire about its axis,
   two tire bead spreading arm means mounted to said support assembly, said arm means being adapted for spreading apart the beads of a tire to permit inspection thereof and including an offset whereby said beads are also pulled downwardly by said arm means, each of said arm means including at least one arm element comprising first and second perpendicular elongate sections and a third section connected to the free end of said second section, an obtuse angle being formed between said second and third sections,
   roller means on the free end of said first section of said arm means for engaging the inside of the beads of the tire to be inspected on said machine to permit a tire to be rotated while said arm means spread and pull downwardly on said tire beads, and
   means for moving the roller means of one arm means toward and away from the roller means of the other arm means.

2. The invention set forth in claim 1 wherein said drive means includes a pair of spaced apart drive rollers disposed parallel to one another at the top of said support assembly and motor means for rotating said drive rollers to cause rotation of a tire supported thereon.

3. The invention set forth in claim 1 wherein said roller means comprise elongate cylindrical rollers which are arranged generally perpendicular to said second section of said arm elements.

4. The invention set forth in claim 3 wherein each of said arm means comprises a pair of said arm elements and cylindrical rollers.

5. The invention set forth in claim 1 wherein said machine further includes means for supporting the sidewalls of a tire to be inspected on said machine when the beads thereof are spread apart and pulled downwardly.

6. The invention set forth in claim 5 wherein said support means comprise wheel means rotatably mounted to the top of said support assembly and arranged for engaging the tire sidewalls when the beads of a tire are spread apart and pulled downwardly, said wheels being angled upwardly intermediate said drive means.

7. The invention set forth in claim 1 wherein tire lift means are provided on said machine for elevating a tire to its inspection position resting on said tire drive means.

8. The invention set forth in claim 7 wherein said tire lift means includes a rectangular frame comprising end and side frame elements, parallel elongate plates pivotally mounted to a side of said support assembly and to an end of said frame, and power means coupled to said plates for rotating same about the ends thereof coupled to said support assembly to elevate said frame toward the top of said support assembly.

9. The invention set forth in claim 8 wherein coupling means are provided between said plates and said side members of said frame, said coupling means including another plate means rigidly affixed to the end of each plate remote from said support assembly, a pin being provided adjacent the free end of each of said another plates and slotted plate means pivotally coupled to each of the side elements of said frame, the slot of each of said slotted plate means being slidably disposed about one of said pins of said another plate means.

10. The invention set forth in claim 9 wherein each of said slots is located adjacent the free end of said slotted plate means and each of said slotted plate means includes a latch means for locking said pin against the inward end of said slot means.

11. The invention set forth in claim 8 wherein a cylinder is rotatably mounted between the side elements of said frame adjacent the end thereof remote from said support assembly.

12. The invention set forth in claim 8 wherein said power rotating means comprises a pneumatic cylinder coupled to said support assembly, the piston thereof being coupled to each of said parallel elongate plates intermediate the ends thereof.

13. The invention set forth in claim 4 wherein said moving means comprises a pair of elongate rod means mounted to said support assembly normal to said drive means, said rod means being rotatable about their axis, and means coupling said rod means to the ends of the third sections of said arm elements.

14. The invention set forth in claim 13 wherein said coupling means comprises a pair of parallel pipe means perpendicularly mounted to each of said elongate rod means and a third pipe means being coupled between said pair of parallel pipe means, said arm elements being coupled to said third pipe means by annular collars secured to the ends of said third sections.

15. The invention set forth in claim 14 wherein said elongate rod means extend outwardly from the end of said support assembly, lever plate means rigidly affixed to each of said rod means adjacent the outward end thereof and hydraulic cylinder means coupled between the ends of said lever plate means for varying the distance therebetween to cause rotation of said elongate rod means and resultant movement of said arm means toward or away from one another.

16. The invention set forth in claim 1 wherein said machine also includes a guide frame mounted to the top of said support assembly, said guide frame including parallel upright supports and a generally U-shaped alignment element mounted parallel to the top of said support assembly and adapted for surrounding said tire when it is mounted on said machine to prevent misalignment thereof during inspection and rotation.

17. The invention set forth in claim 16 wherein a light is mounted on said machine for illuminating the area of said tire to be inspected on said machine.

18. A tire inspection machine comprising;
a housing for supporting a tire in a vertical position, said housing including a pair of parallel and spaced apart drive rollers disposed at the top thereof for supporting said tire and rotating same about its axis, motor means for revolving said drive rollers and control means for said motor means adapted to vary the revolution speed of said drive rollers;
a tire lift means for elevating a tire to its inspection position resting on said drive rollers;
a pair of sidewall support rollers rotatably mounted to the top of said housing intermediate said drive rollers on either side of said inspection position, said sidewall support rollers being adapted for contacting the sidewalls of a tire when the same is being inspected on said machine;
a pair of tire bead spreading arms mounted to said housing said arms being adapted for engaging the beads of a tire supported on said drive rollers and spreading the beads thereof apart for inspection, said arms including an offset;
rollers coupled to the inward end of said arms for permitting said tire to be rotated while the tire beads are spread apart; and
means coupled to the outward end of said arms for pulling said arms apart and down, whereby the tire beads are spread apart and pulled downwardly.

19. The invention set forth in claim 18 wherein each of said arm means includes at least one arm element comprising first and second perpendicular elongate sections and a third section connected to the free end of said second section, an obtuse angle being formed between said second and third sections and said roller means being rotatably mounted to the free end of said first section.

20. The invention set forth in claim 19 wherein said roller means comprise elongate cylindrical rollers which are arranged generally perpendicular to said second section of said arm elements.

21. The invention set forth in claim 20 wherein each of said arm means comprises a pair of said arm elements and cylindrical rollers.

22. The invention set forth in claim 21 wherein said moving means comprises a pair of elongate rod means mounted to said housing normal to said drive rollers, said rod means being rotatable about their axis and means coupling said pipe means to the ends of the third sections of said arm elements.

23. The invention set forth in claim 22 wherein said coupling means comprises a pair of parallel pipe means perpendicularly mounted to each of said elongate rod means and a third pipe means being coupled to said third pipe means by annular collars secured to the ends of said third sections.

24. The invention set forth in claim 23 wherein said elongate rod means extend outwardly from the end of said housing, lever plate means being rigidly affixed to each of said rod means adjacent the outward end thereof and pneumatic cylinder means coupled between the ends of said lever plate means for varying the distance therebetween to cause rotation of said elongate rod means and resultant movement of said arm means toward or away from one another.

25. A tire inspection machine comprising:
a housing for supporting a tire in a vertical position, said housing including a pair of parallel and spaced apart drive rollers disposed at the top thereof for supporting said tire and rotating same about its axis, motor means for revolving said drive rollers and means for selectively stopping said revolution;
tire lifting means for elevating a tire to its inspection position resting on said drive rollers, said tire lifting means including a rectangular frame comprising end and side frame elements, parallel elongate plates pivotally mounted to a side of said housing and to an end of said frame and power means coupled to said plates for rotating same about the ends thereof coupled to said support assembly to elevate said frame toward the top of said support assembly;

a pair of tire bead spreading arms mounted to said housing for spreading apart the beads of a tire and pulling downwardly on same and rollers on said spreading arms to permit said tire to be rotated while said beads are spread apart and pulled downward; and coupling means provided between said plates and said side members of said frame, said coupling means including another plate means rigidly affixed to the end of each plate remote from said support assembly, a pin being provided adjacent the free end of each of said another plates and slotted plate means being pivotally coupled to each of the side elements of said frame, the slot of each of said slotted plate means being slidably disposed about one of the pins of said another plate means.

26. The invention set forth in claim 25 wherein each of said slots is located adjacent the outward end of said slotted plate means and each of said slotted plate means includes a latch means for locking said pin against the inward end of said slot means.

27. The invention set forth in claim 26 wherein a cylinder is rotatably mounted between the side elements of said frame adjacent the end thereof remote from said housing.

28. The invention set forth in claim 27 wherein said power rotating means comprises pneumatic cylinder means coupled to said housing, the piston thereof being coupled to said parallel elongate plates intermediate the ends thereof.

29. The invention set forth in claim 18 wherein said machine also includes a guide frame mounted to the top of said housing at the end thereof opposite said lift means, said guide frame including parallel upright supports and a generally U-shaped alignment element mounted parallel to the top of said housing and adapted for surrounding said tire when it is mounted on said machine to prevent misalignment thereof during inspection and rotation.

30. The invention set forth in claim 25 wherein said machine also includes a guide frame mounted to the top of said housing at the end thereof opposite said lift means, said guide frame including parallel upright supports and a generally U-shaped alignment element mounted parallel to the top of said housing and adapted for said surrounding a tire when it is mounted on said machine to prevent misalignment thereof during inspection and rotation.

* * * * *